United States Patent
Armstrong et al.

(10) Patent No.: US 9,080,776 B2
(45) Date of Patent: Jul. 14, 2015

(54) FAN APPARENCY ARRANGEMENT FOR AN APPLIANCE

(75) Inventors: James Armstrong, Louisville, KY (US);
Christopher Mast, Louisville, KY (US);
Derek Lee Watkins, Elizabethtown, KY (US); Justin T. Brown, Louisville, KY (US)

(73) Assignee: General Electric Company, Schenectady, NY (US)

( * ) Notice: Subject to any disclaimer, the term of this patent is extended or adjusted under 35 U.S.C. 154(b) by 1669 days.

(21) Appl. No.: 12/198,475

(22) Filed: Aug. 26, 2008

(65) Prior Publication Data
US 2010/0051244 A1 Mar. 4, 2010

(51) Int. Cl.
| F24C 15/20 | (2006.01) |
| F24C 15/00 | (2006.01) |
| F24C 5/16 | (2006.01) |
| F24C 3/12 | (2006.01) |
| A21B 3/04 | (2006.01) |
| A21B 3/02 | (2006.01) |
| A21B 1/40 | (2006.01) |

(52) U.S. Cl.
CPC .............. *F24C 15/006* (2013.01); *A21B 3/02* (2013.01); *A21B 1/40* (2013.01); *A21B 3/04* (2013.01); *F24C 5/16* (2013.01); *F24C 15/2007* (2013.01)

(58) Field of Classification Search
CPC .. F24C 15/006; F24C 15/2007; F24C 15/001; F24C 3/008; F24C 3/027; F24C 3/128; F24C 5/16; F24C 15/2021; F24C 3/12; F27D 2017/0031; A21B 3/04; A21B 3/02; A21B 1/40; F24D 17/003
USPC .......... 126/21 R, 21 A, 15 A, 15 R; 110/185, 110/189, 193; 219/757; 237/2 R, 47
IPC ...... F26B 25/00; F24C 15/20,5/16, 3/12; A21B 3/04, 3/02, 1/40
See application file for complete search history.

(56) References Cited

U.S. PATENT DOCUMENTS

| 1,178,290 A | * | 4/1916 | Berry ........................... 126/39 D |
| 1,796,198 A | * | 3/1931 | Gehnrich ......................... 34/534 |
| 1,938,625 A | * | 12/1933 | Engels ............................. 237/11 |
| 1,946,923 A | * | 2/1934 | Wilcox ........................... 34/418 |
| 2,158,881 A | * | 5/1939 | McCormick ................ 126/39 C |
| 2,740,858 A | * | 4/1956 | Euler ....................... 200/81.9 R |

(Continued)

FOREIGN PATENT DOCUMENTS

| EP | 395143 A1 | * | 10/1990 | ............... A47J 37/04 |
| GB | 2043237 A | * | 10/1980 | ................ F24C 3/08 |

(Continued)

*Primary Examiner* — Gregory Huson
*Assistant Examiner* — Daniel E Namay
(74) *Attorney, Agent, or Firm* — Global Patent Operation; Douglas D. Zhang

(57) ABSTRACT

A fan apparency arrangement for an appliance is disclosed. The appliance has a chamber with a first port and a second port. The arrangement includes a fan for moving air in or out of the chamber, and a sail switch disposed adjacent to the second port. When activated, the fan moves air in or out of the chamber through the first port to create a pressure difference between an inside and an outside of the chamber. The pressure difference causes the sail switch to change position and signal that the fan is activated. An appliance incorporating such a fan apparency arrangement is also disclosed.

17 Claims, 6 Drawing Sheets

(56) References Cited

U.S. PATENT DOCUMENTS

| | | | | |
|---|---|---|---|---|
| 2,788,411 | A * | 4/1957 | Porwancher | 200/81.5 |
| 2,790,042 | A * | 4/1957 | Porwancher | 200/81.9 R |
| 2,948,286 | A * | 8/1960 | Turner | 52/1 |
| 3,103,347 | A * | 9/1963 | Fath et al. | 432/32 |
| 3,228,113 | A * | 1/1966 | Fannon, Jr. | 34/308 |
| 3,419,698 | A * | 12/1968 | Palmero et al. | 219/601 |
| 3,422,809 | A * | 1/1969 | Perry | 126/21 A |
| 3,431,056 | A * | 3/1969 | Winegardner | 431/20 |
| 3,485,257 | A * | 12/1969 | Wyatt et al. | 137/91 |
| 3,499,430 | A * | 3/1970 | Kemp | 126/21 R |
| 3,499,431 | A * | 3/1970 | McArthur, Jr. | 126/39 R |
| 3,507,265 | A * | 4/1970 | Dills et al. | 126/21 R |
| 4,020,821 | A | 5/1977 | Reid, Jr. et al. | |
| 4,208,572 | A * | 6/1980 | Melgaard | 219/400 |
| 4,331,124 | A * | 5/1982 | Seidel et al. | 126/21 A |
| 4,373,504 | A * | 2/1983 | Day | 126/21 A |
| 4,392,038 | A * | 7/1983 | Day et al. | 219/738 |
| 4,430,541 | A * | 2/1984 | Day, Jr. | 219/683 |
| 4,479,115 | A | 10/1984 | Holzhauer | |
| 4,480,628 | A * | 11/1984 | Simpson | 126/21 A |
| 4,505,194 | A | 3/1985 | Bishop et al. | |
| 4,627,409 | A * | 12/1986 | Kagomoto | 126/21 A |
| 4,725,700 | A * | 2/1988 | Zoludow | 200/81.9 R |
| 4,921,509 | A | 5/1990 | Maclin | |
| 4,964,392 | A | 10/1990 | Bruno et al. | |
| 5,073,390 | A * | 12/1991 | Knight et al. | 426/113 |
| 5,142,125 | A * | 8/1992 | Fioroli et al. | 219/400 |
| 5,154,940 | A * | 10/1992 | Budzyna et al. | 426/232 |
| 5,215,073 | A | 6/1993 | Wilson | |
| 5,236,282 | A * | 8/1993 | Teasel et al. | 405/128.7 |
| 5,632,614 | A | 5/1997 | Consadori et al. | |
| 6,449,876 | B1 | 9/2002 | Pursell | |
| 6,481,433 | B1 * | 11/2002 | Schjerven et al. | 126/21 A |
| 6,772,752 | B1 | 8/2004 | Boyer | |
| 7,291,820 | B2 * | 11/2007 | Sin | 219/757 |
| 7,297,905 | B2 * | 11/2007 | Kim et al. | 219/400 |
| 7,368,684 | B2 * | 5/2008 | Kim et al. | 219/400 |
| 8,393,319 | B2 * | 3/2013 | Hoffmeier | 126/190 |
| 2006/0130824 | A1 * | 6/2006 | Rummel et al. | 126/21 A |
| 2013/0333684 | A1 * | 12/2013 | Cescot et al. | 126/21 A |

FOREIGN PATENT DOCUMENTS

| | | | | |
|---|---|---|---|---|
| GB | 2261484 A | * | 5/1993 | F16B 7/14 |
| JP | 2009021246 A | * | 1/2009 | |

* cited by examiner

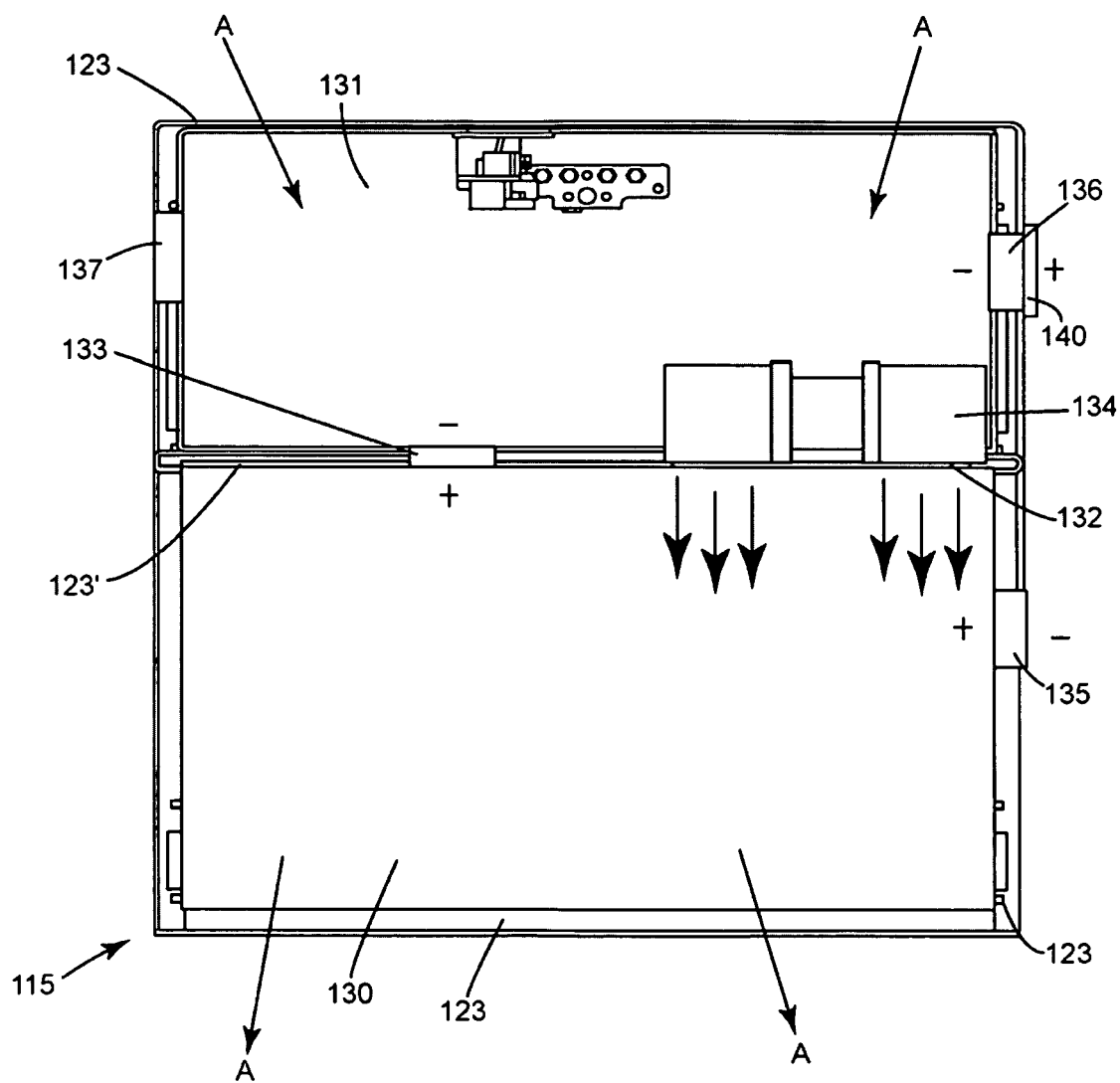

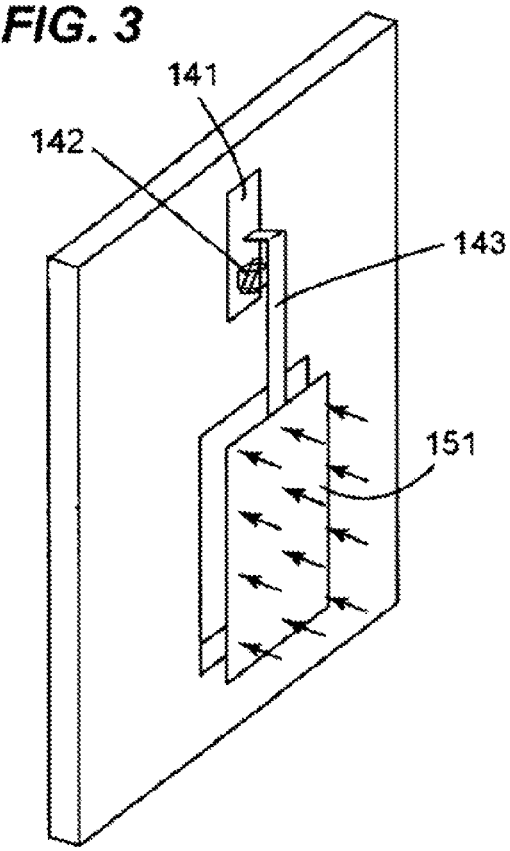
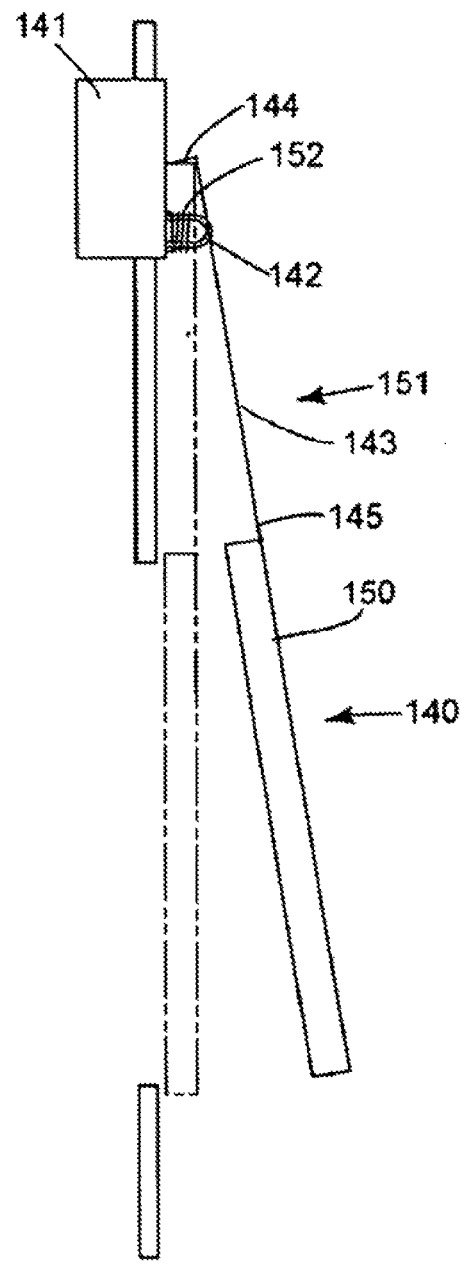
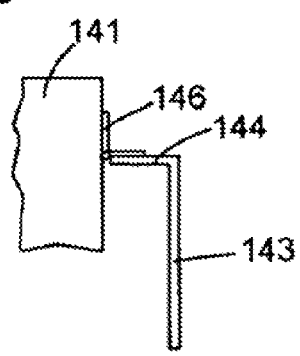

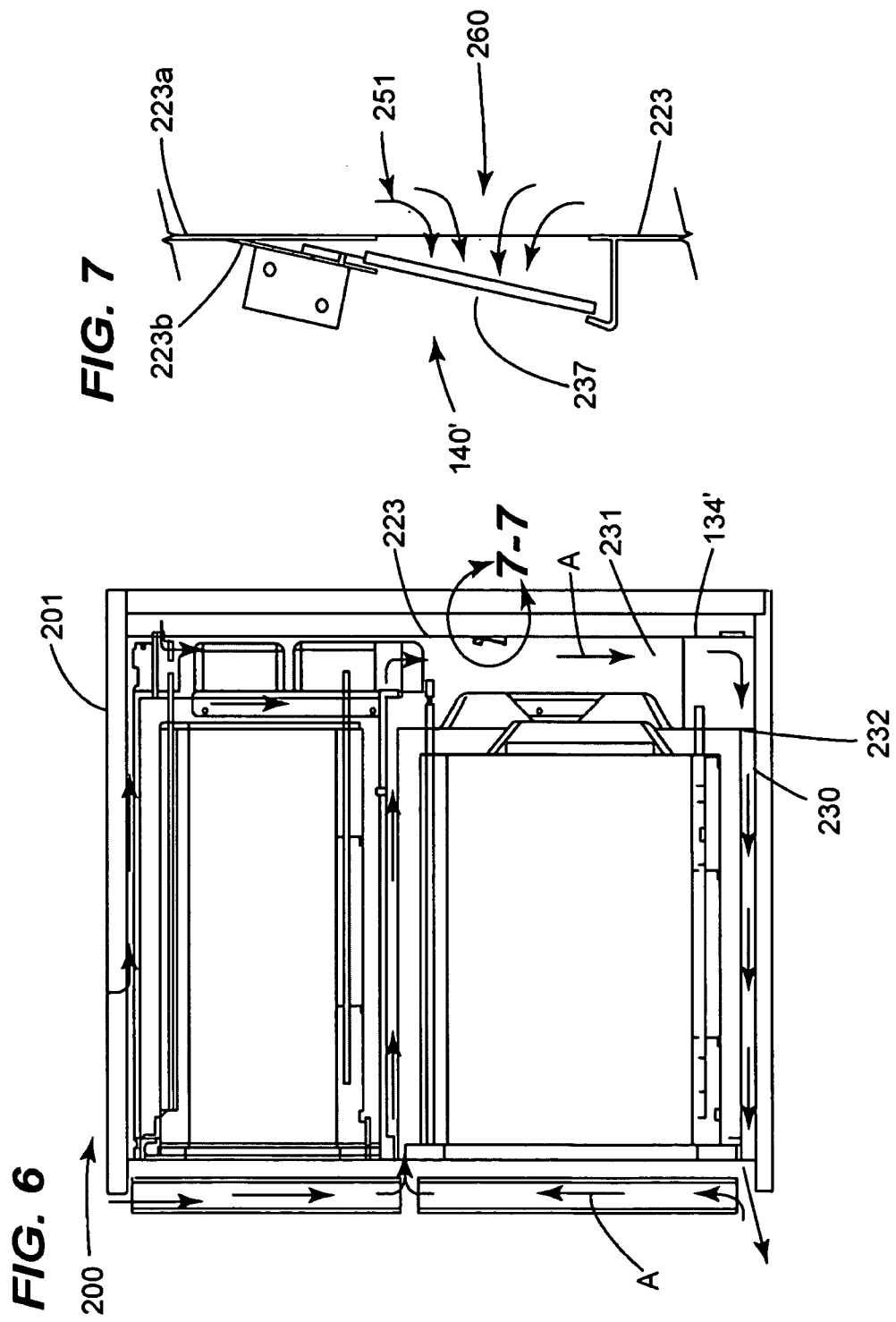

FAN APPARENCY ARRANGEMENT FOR AN APPLIANCE

BACKGROUND OF THE INVENTION

The present invention relates generally to a fan apparency arrangement. More particularly, the present invention relates to a fan apparency arrangement for an appliance and an appliance incorporating such a fan apparency arrangement.

Appliances such as cooking ranges and wall ovens are widely used. A cooking range typically includes an oven with a front-opening access door, and at least one heating element for heating up the inside of the oven cavity. Wall ovens have a similar configuration. As is known in the art, when energized, the heating element can heat up the inside of the oven cavity to a relatively high temperature. Also as is known in the art, such cooking appliance often has a fan which is used to draw cooling air into the interior of the appliance to cool a structural component of the appliance, such as the front-opening access door, or a heat sensitive component such as an electronic control. If an appliance employs a fan for cooling, some certification institutions, such as Underwriters Laboratories Inc. (UL), require that a fan apparency device (FAD) be employed to determine or detect whether the fan is working properly.

As is known in the art, when a user selects or chooses a heating operation for the oven and turns on the oven, the turning-on also activates the fan. If the fan is working properly, the FAD enables the selected heating operation for the oven to proceed. On the other hand, if the fan is stalled or not working properly, the FAD prevents the selected heating operation for the oven from proceeding.

Various types of FADs are used to determine or detect whether the fan is working properly. The most widely used FADs are thermal switches and sail switches. A thermal switch uses the heat from the oven to heat up a bimetal member of the switch to turn off the switch when the airflow from the fan is not sufficient to cool off the bimetal member. Since the thermal switch usually is not disposed adjacent the intake end or the discharge or exhaust end of the fan, it does not negatively affect the airflow passing through the fan. However, the thermal switch has a relatively slow reaction time. In addition, the thermal switch needs to be installed in an area of the oven where the temperature can rise quickly when the oven is turned on. Moreover, the thermal switch requires extensive testing to prove that it will work as intended in all working conditions of the oven.

A typical sail switch uses the airflow generated by the fan to move a sail to turn on or off the switch. Compared with the thermal switch, the sail switch has a relatively fast reaction time, and requires less testing. However, since the sail is disposed downstream and in the flow-path of the fan, it negatively affects the airflow passing through the fan. Additionally, the sail becomes an undesirable dynamic load for the fan.

BRIEF DESCRIPTION OF THE INVENTION

As described herein, the preferred embodiments of the present invention overcome one or more of the above or other disadvantages known in the art.

One aspect of the present invention relates to a fan apparency arrangement for an appliance. The appliance has a chamber with a first port and a second port. The arrangement includes a fan for moving air in or out of the chamber, and a sail switch disposed adjacent to the second port. When activated, the fan moves air in or out of the chamber through the first port to create a pressure difference between an inside and an outside of the chamber. The pressure difference causes the sail switch to change position and signal that the fan is activated.

Another aspect of the present invention relates to an appliance that includes a chamber having a first port and a second port, an air blower for moving air out of the chamber, and a pressure sensitive device disposed adjacent to the second port. The pressure sensitive device includes a switch for signaling the activation of the air blower, and a sail member movable between a first position where the sail member does not turn on the switch and a second position where the sail member turns on the switch. When activated, the air blower moves air out of the chamber through the first port to create a pressure difference between an interior surface and an exterior surface of a wall of the chamber that defines the second port. The pressure difference causes the sail member to move from the first position to the second position.

Yet another aspect of the present invention relates to an appliance that includes a chamber having a first port and a second port, an air blower disposed in the chamber, and a pressure sensitive device disposed adjacent to the second port. The pressure sensitive device includes a switch for signaling the activation of the air blower, and a sail member pivotably supported by the chamber. The sail member is movable between a first position where the sail member does not turn on the switch and a second position where the sail member turns on the switch to signal the activation of the air blower. When activated, the air blower moves air out of the chamber through the first port to create a pressure difference between an inside and an outside of the chamber. The pressure difference causes the sail member to move from the first position to the second position.

These and other aspects and advantages of the preferred embodiments of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 2A-2C are enlarged, cross-sectional views along lines I-I in FIG. 1, showing three possible positions of the sail switch of the fan apparency arrangement;

FIG. 3 is a schematic, perspective view of the sail switch of the fan apparency arrangement of FIG. 2A, 2B or 2C;

FIG. 4 is an enlarged, schematic, side view of the sail switch of FIG. 3;

FIG. 5 is an enlarged, schematic, view of part of the sail switch of FIG. 3, showing how the sail arm is pivotably attached to the switch housing;

FIG. 6 is a schematic, cross section view of an exemplary double-cavity wall oven incorporating a fan apparency arrangement in accordance with another preferred embodiment of the present invention; and FIG. 7 is an enlarged view of a portion of FIG. 6.

DETAILED DESCRIPTION OF THE PREFERRED EMBODIMENTS OF THE INVENTION

Figure 1:
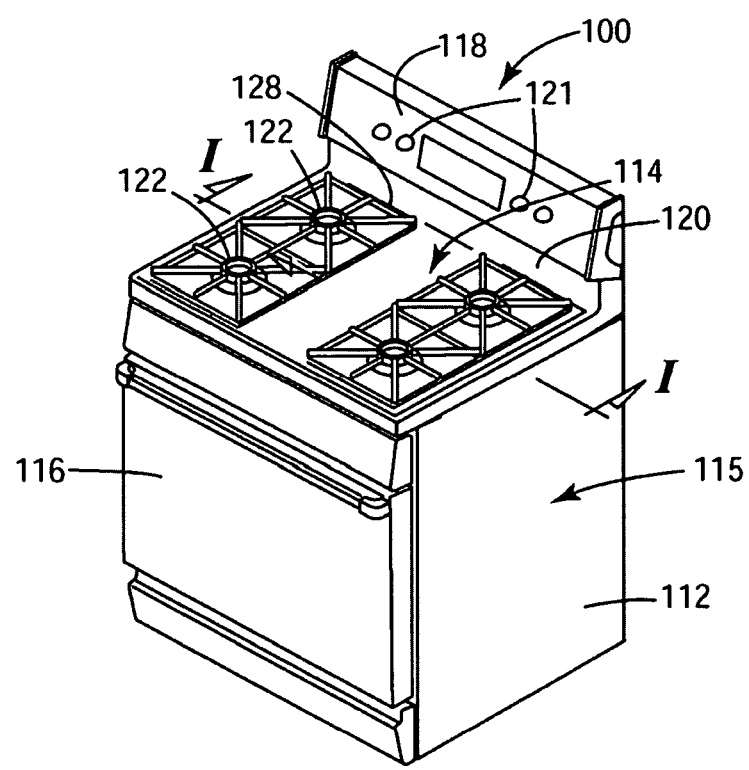
FIG. 1 is a perspective view of an exemplary cooking range incorporating a fan apparency arrangement in accordance with a preferred embodiment of the present invention.

An exemplary appliance incorporating a fan apparency arrangement in accordance with a preferred embodiment of the present invention is generally designated by reference numeral 100 in FIG. 1. By way of non-limiting example, the appliance 100 is shown as a freestanding cooking range in FIG. 1. However, the preferred embodiments of the present invention can also be used in other types of appliances such as ovens, dryers, etc.

The cooking range 100 includes an outer body or housing 112 that has a generally rectangular shaped cook top 114. An oven 115, not shown in detail, is positioned below the cook top 114 and has a front-opening access door 116 for closing the oven cavity. Preferably, an integral backsplash 118 extends upward from a rear edge 120 of the cook top 114 and contains various controls 121 for selectively operating heating elements 128 such as gas burners 122 on the cook top 114 and heating elements (not shown) in the oven 115.

Figure 2A:
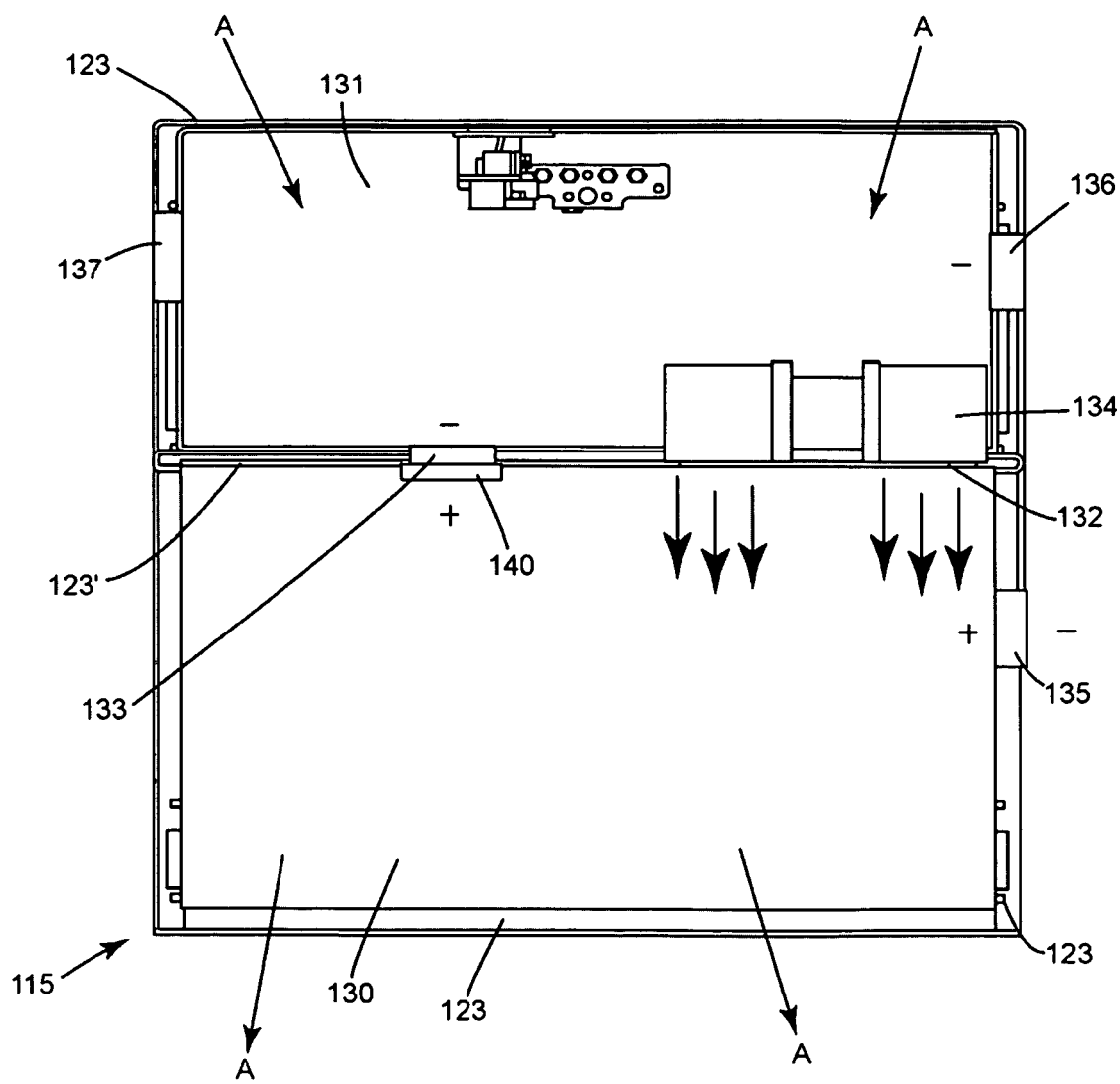
Figure 2B:
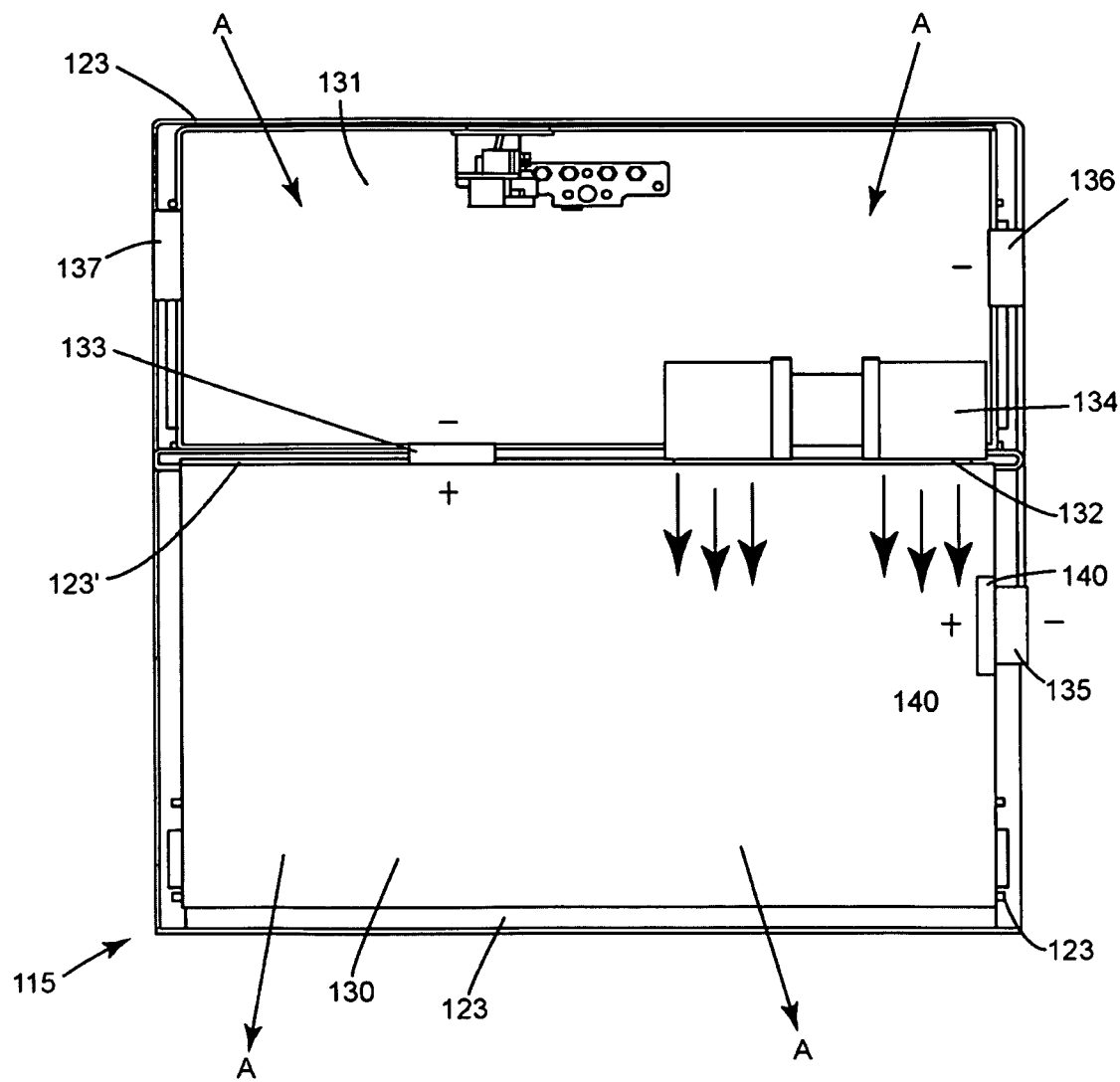

As clearly shown in FIGS. 2A-2C, the peripheral wall 123 and the interior wall or partition 123' of the range 100 define or form a chamber 130. The term "chamber" is not limited to the one illustrated in FIGS. 2A-2C. Rather, it covers any confined space formed in the interior of the range 100. Furthermore, the peripheral wall 123 and the interior wall 123' define or form another chamber 131 which is adjacent to the chamber 130. The interior wall 123' has ports 132, 133. As explained in detail below, an air blower such as an electric fan 134 is arranged in the chamber 131 and adjacent to the port 132 for moving cooling or ambient air from outside of the chamber 131 into the chamber 131 and then into the chamber 130 (the arrows A in FIGS. 2A-2C illustratively show the direction of the airflow). The fan 134, which can be a centrifugal blower type fan, is known in the art and therefore will not be discussed in detail here. The peripheral wall 123 also has a port 135 in the chamber 130, and ports 136, 137 in the chamber 131.

When activated or energized, the fan 134 draws air into the chamber 130 from the chamber 131 through the port 132, which in turn forces air in the chamber 130 to exit through the port 135 (see FIGS. 2A and 2C). The fan 134 also forces air in the chamber 130 to move back into the chamber 131 through the port 133 (see FIGS. 2B and 2C). The fan 134 also draws cooling or ambient air from the atmosphere or outside of the chamber 131 into the chamber 131 through the ports 136, 137 (see FIGS. 2A and 2B). As indicated in FIGS. 2A-2C, when the fan 134 is activated or energized, there is a pressure difference between the inside of the chamber 130 and the outside of the chamber 130 including the inside of the chamber 131. More specifically, the pressure in the chamber 130 is higher than the atmospheric pressure or the pressure in the chamber 131. Similarly, there is a pressure difference between the pressure in the chamber 131 and the pressure outside of the range 100. More specifically, the pressure in the chamber 131 is lower than the atmospheric pressure or the pressure outside the range 100.

As illustrated in FIGS. 2A-2C, the peripheral wall 123 of the range 100 is not airtight. As a result, air can move in or out of each of the chambers 130, 131 through other ports or openings (not shown), as indicated by the arrows A in FIGS. 2A-2C. In the configuration shown in FIGS. 2A-2C, each of the chambers 130, 131 needs at least two ports—one functions as an air inlet, the other as an air outlet. Preferably, when a pressure sensitive device such as a sail switch is used to substantially cover an air inlet or outlet of a chamber, an additional air inlet or outlet (see, for example, the port 137) is provided in communication with that chamber so that the presence of the sail switch will not undesirably affect the airflow of the cooling air into or out of that chamber.

Referring now to FIGS. 3 and 4, a pressure sensitive device such as the sail switch 140 is used for signaling the activation of the fan 134. The sail switch 140 preferably includes a switch housing 141 affixed to the peripheral wall 123 or the interior wall 123'. The switch housing 141 can be made part of the wall 123 or 123'. The sail switch 140 also includes a lever 142 which is supported by, and movable relative to, the switch housing 141. The sail switch 140 further includes a sail arm 143, one end 144 of which is bent and is pivotably attached to the switch housing 141 by a hinge arrangement 146 (see FIG. 5). The bent end 144 is preferably positioned adjacent to the lever 142. The other end 145 of the sail arm 143 is attached to a sail 150. The sail arm 143 and the sail 150 form a sail member 151.

An elastic member such as a compression spring 152 is arranged on the lever 142. One end of the compression spring 152 abuts or is against the switch housing 141. The other end of the spring 152, which is distal to the switch housing 141, is fixedly attached to the lever 142. As clearly illustrated in FIGS. 3 and 4, the sail switch 140 is positioned adjacent to a port 133, 135, or 136, with the sail 150 being sized to at least partially cover the port 133, 135, or 136. As illustrated in FIGS. 2A, 2B and 2C, when the sail switch 140 is positioned adjacent to the port 133, 135, or 136 and when a third port is used, it is not in the flow-path of the fan 134 and therefore does not negatively affect the airflow passing through the fan 134. When the fan 134 is not activated or energized, there is no pressure difference between the inside and outside of the respective chamber 130, 131, the urging force of the spring 152 pushes the lever 142 away from the switch housing 141, which in turn pushes the sail arm 143 away from the switch housing 141. This is the open position of the sail switch 140 where the sail 150 is away from the port 133, 135, or 136 and the sail switch is turned off.

When the fan 134 is activated or energized, as discussed above, there is a pressure difference between the inside and outside of the respective chamber 130, 131. This pressure difference acts on the sail 150 and forces it to move from the open position to a close position where the sail 150 at least partially covers the port 133, 135, or 136. Meanwhile, the sail arm 143 overcomes the urging force of the spring 152 and moves or pushes the lever 142 toward the switch housing 141 so that the sail switch 140 is turned on.

During operation, a user selects a heating operation for the oven 115 and activates the oven 115 by a start switch or dial (not shown). Activating the oven 115 in turn activates the fan 134. If the fan 134 works properly, the resulting pressure difference created about the sail will move the sail to actuate the sail switch 140, which in turn signals the activation of the fan 134 and enables the selected heating operation to proceed. However, if the fan 134 does not work properly to create a sufficient pressure difference, the sail switch 140 will not be turned on, which in turn prevents the selected heating operation from proceeding, and the oven 115 will generate or display an error or service needed signal for the user. These are known in the art, and therefore will not be discussed further here.

FIG. 6 shows an exemplary double-cavity oven 200 that incorporates a fan apparency arrangement in accordance with another preferred embodiment of the present invention. The oven 200 is shown disposed in a wall section 201. The oven 200 has chambers 230 and 231 that are in flow or fluid communication with each other through a port 232. The fan 134' is disposed in the chamber 231 with its exhaust end aiming at and adjacent to the port 232. The fan 134' can be identical or substantially similar to the fan 134 shown in FIGS. 2A-2C. Again, arrows A are used to indicate the direction of the airflow. As illustrated in FIG. 6, ambient air can be drawn into the chamber 231 through various ports or openings.

Referring now to FIG. 7, the peripheral wall 223 of the oven 200 has a recessed area 260. More specifically, the back section of the peripheral wall 223 has a substantially vertically disposed primary wall section 223a, and a secondary wall section 223b. The secondary wall section 223b extends outward and downward from the primary wall section 223a, and has a port 237.

As clearly shown in FIG. 7, a sail switch 140' is used in connection with the recessed area 260. The sail switch 140's can be identical or substantially similar to the sail switch 140 shown in FIGS. 3-5, with the exception that the sail switch 140's does not employ any compression spring to urge the sail member 251 to move back to its initial position. Rather, when there is no pressure difference between the inside and outside of the chamber 231, the sail member 251 will move back and stay in its initial position by gravity.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An appliance comprising:
    an oven cavity;
    a chamber different from the oven cavity, the chamber having a first port, a second port and a third port;
    an air blower disposed in the chamber; and
    a pressure sensitive device comprising:
        a switch for signaling activation of the air blower; and
        a sail member pivotably supported by the chamber and disposed adjacent to the second port, the sail member being movable between a first position where the sail member does not turn on the switch and does not close the second port and a second position where the sail member turns on the switch to signal the activation of the air blower and substantially closes the second port,
    wherein when activated, the air blower moves air into the chamber through the third port and out of the chamber through the first port to create a pressure difference between an inside and an outside of the chamber, and wherein the sail member is so positioned relative to the air blower that the pressure difference between the inside and the outside of the chamber causes the sail member to move from the first position to the second position.

2. The appliance of claim 1, wherein the sail member comprises a sail arm having a first end pivotably supported by the chamber and a second end opposite to the first end, the sail member further comprising a sail attached to the second end.

3. The appliance of claim 1, wherein the sail member returns to and remains in the first position by gravity.

4. The appliance of claim 1, wherein when in the first position, the sail member is disposed outside of an airflow path of the air blower.

5. The appliance of claim 4, wherein the airflow path is disposed upstream of the air blower.

6. The appliance of claim 4, wherein when in the first position, the sail member is disposed parallel to part of the airflow path that is adjacent to the second port.

7. The appliance of claim 1, wherein the second port is disposed upstream of the air blower.

8. An appliance comprising:
    a chamber having a first port, a second port and a third port;
    an air blower; and
    a pressure sensitive device comprising:
        a switch for signaling activation of the air blower; and
        a sail member pivotably supported by the chamber and disposed adjacent to the second port, the sail member being movable between a first position where the sail member does not turn on the switch and does not close the second port and a second position where the sail member turns on the switch and substantially closes the second port,
    wherein when activated, the air blower moves air into the chamber through the third port and out of the chamber through the first port to create a pressure difference between an interior surface and an exterior surface of a wall of the chamber that defines the second port, and wherein the sail member is so positioned relative to the air blower that the pressure difference between the interior surface and the exterior surface of the wall causes the sail member to move from the first position to the second position.

9. The appliance of claim 8, wherein the sail member comprises a sail arm having a first end pivotably supported by the chamber and a second end opposite to the first end, the sail member further comprising a sail attached to the second end.

10. The appliance of claim 8, wherein the sail member returns to and remains in the first position by gravity.

11. The appliance of claim 9, wherein the pressure sensitive device further comprises an elastic member for urging the sail member back to the first position.

12. The appliance of claim 11, wherein the elastic member comprises a compression spring which is supported by the wall of the chamber and disposed adjacent to the first end of the sail arm.

13. The appliance of claim 12, wherein the switch comprises a lever movable relative to the wall, the compression spring having a first end fixedly attached to the lever and a second end disposed against the wall of the chamber.

14. The appliance of claim 8, wherein when in the first position, the sail member is disposed outside of an airflow path of the air blower.

15. The appliance of claim 14, wherein the airflow path is disposed upstream of the air blower.

16. The appliance of claim 14, wherein when in the first position, the sail member is disposed parallel to part of the airflow path that is adjacent to the second port.

17. The appliance of claim 8, wherein the second port is disposed upstream of the air blower.

* * * * *